United States Patent Office 3,371,050
Patented Feb. 27, 1968

3,371,050
PROMOTED CATALYST FOR PRODUCTION OF TOWN GAS AT LOW TEMPERATURES
William F. Taylor, Scotch Plains, and John H. Sinfelt, Berkeley Heights, N.J., assignors to Esso Research and Engineering Company, a corporation of Delaware
No Drawing. Filed Feb. 18, 1964, Ser. No. 345,575
4 Claims. (Cl. 252—459)

ABSTRACT OF THE DISCLOSURE

The activity of $Ni-Al_2O_3$ and $Ni-SiO_2$ catalysts is increased by incorporating about 0.1 to about 6 wt. percent copper, based on the total nickel and copper content, in the catalyst. The catalyst is especially useful for the production of town gas at low temperatures.

---

This invention relates to high-activity nickel catalysts given an increased activity by a low concentration, i.e., 0.1 to 6 wt. percent of copper (as percent of total nickel and copper content), for useful low-temperature reactions of naphtha paraffins with steam to form gas products containing methane, hydrogen and carbon dioxide and low temperature reactions of paraffins with hydrogen to form methane.

In the past, the reactions of hydrocarbons, generally normally gaseous hydrocarbons, such as methane, with steam were carried out with a nickel-containing catalyst at high temperatures, usually above 1000° F., to produce $H_2$, $CO_2$ and CO, such reactions requiring high heat input. The catalyst for these high temperature reactions has to be refractory to be stable at the high temperatures. As a rule, such a heat-resistant catalyst has been made by depositing nickel and promoting metal compounds on refractory supporting solid materials such as pumice, alumina, or kieselguhr particles. These catalysts subjected to high temperatures have low nickel surface areas on account of the sintering of the nickel at temperatures above 925° F., and consequently have low activity in low-temperature reactions.

In accordance with the present invention, the low temperature reactions of naphtha hydrocarbons with $H_2O$ or with $H_2$ are carried out at reaction temperatures principally below 900° F. and preferably in the range of 650° to 850° F. with a high-activity nickel catalyst characterized by high nickel surface areas in the range of 20 to about 60 square meters per gram of catalyst, and a critically small amount of reduced copper which is incorporated to promote the activity of the nickel, the critical amount of copper being in the range of 0.1 to 6 wt. percent of the total nickel and copper content.

The high nickel surface area catalyst was found to be prepared best by coprecipitation of nickel and aluminum ions as hydroxides, carbonates, or basic carbonates, e.g., by adding ammonium bicarbonate to an aqueous solution of nickel nitrate and aluminum nitrate, or coprecipitation of nickel with silicate ions, so that the catalyst finally has a nickel well interspersed with alumina or silica. The Ni thus can interact with the alumina and silica to become bonded therewith. A promoter may be added as a decomposable compound to the precipitate or may be also coprecipitated with the nickel and aluminum compounds. The precipitate may be formed in the aqueous solution at temperatures of 32° to 212° F. or the boiling point of the slurry. The precipitate is then separated from the remaining aqueous solution to be dried at a temperature preferably in the range of 200° to 400° F., calcined in air at a temperature in the range of 600° to 925° F., and then activated by treatment with hydrogen preferably at 600° to 750° F. The reduced catalyst may then contain from about 25 to 60 wt. percent nickel interspersed with about 75 to 40 wt. percent of alumina or silica. Using small amounts of copper as a promoter, the copper may also be coprecipitated from the aqueous solution of the nickel ions by having copper nitrate salt present in the aqueous solution to which the precipitating agent, e.g., $NH_4HCO_3$, is added.

The method of catalyst preparation is important in obtaining a catalyst of suitable activity, which depends on the surface area of the nickel.

The activity of a catalyst may be expressed in terms of percent of the hydrocarbon feed reactant converted or by the rate of yield of gaseous product, i.e., standard cubic feet of gas produced per hour, at a specified space velocity, reaction temperature, pressure in the reaction zone, and quantity of $H_2O$ or $H_2$ reactant per pound of hydrocarbon feed. The catalytic activity for technical purposes can be determined by using a small laboratory reactor in which the reaction conditions are similar to those to be used in a large scale plant.

The surface area measurements of the nickel with the promoting amount of copper and of the total catalyst are made by gas adsorption methods, using hydrogen chemisorption for measuring the surface area of the reduced nickel-copper in the catalyst per gram of the catalyst, and using nitrogen adsorption (B.E.T. method) for determining the total surface area per gram of the catalyst including the alumina, silica, or other substance present. The surface area of the nickel and copper is determined on catalyst which has been treated with hydrogen for reduction of nickel and copper oxides. The determination of the total surface area is made on the calcined catalyst before the treatment with $H_2$. The B.E.T. method is a well-recognized method described by Emmett, P. H., Advances in Catalysis I, 65 (1948).

Before determining the effects of the copper on the catalytic activity of nickel in a coprecipitated $Ni-Al_2O_3$ or $Ni-SiO_2$ catalyst, a number of catalysts were prepared in which nickel ions and copper ions were coprecipitated on slurried particles of alumina and slurried particles of kieselguhr using various proportions of copper and nickel for determining the effects of the copper as a promoter and the concentration of copper which gave the promoting effect. After precipitation, each of the catalysts was tested to determine activity, expressed as percent conversion of hexane in a standardized catalyst screening test using a space velocity of 2.8 parts by weight of hexane per hour per part by weight of catalyst, 2 lbs. of steam per lb. of hydrocarbon feed, 700° F. inlet temperature, and a pressure of 500 p.s.i.g. Representative examples of catalyst preparation procedures for making the catalysts tested are as follows:

EXAMPLE 1.—$Ni-Al_2O_3$ catalyst without Cu 750 g. $Ni(NO_3)_2 \cdot 6H_2O$ was dissolved in 3.5 liters of deionized water. Then 20 g. of $NH_4HCO_3$ was added to the solution to cause a permanent turbidity. Then 150 g. of eta alumina was added and slurried in the solution. An additional 435 g. of $NH_4HCO_3$ was added to the slurry at a controlled rate so as to minimize foaming. After all $NH_4HCO_3$ was added, the slurry was stirred an additional 10 minutes and allowed to settle overnight. The precipitate was washed and dried overnight at 230° F. The dried precipitate was calcined in air for 4 hours at 750° F. The thus obtained catalyst had a total surface area of 171 m.²/g.

EXAMPLE 2.—$Ni-SiO_2$ catalyst without Cu

The preparation of the second catalyst was the same as the preparation in Example 1 except that 120 g. of kieselguhr was used in place of the eta alumina to form the slurry in the solution. The resulting catalyst analyzed 51.4 wt. percent Ni and had a total surface area of 105 m.²/g. The nickel surface area was 11.8 m.²/g. after reduction with $H_2$ at 390° F.

EXAMPLE 3.—Ni-$Al_2O_3$ catalyst without Cu

The same procedure was used as in Example 1 except for the use of 150 g. of gamma alumina instead of eta alumina. The calcined catalyst showed a total surface area of 124 m.²/g.

EXAMPLE 4.—Ni-$Al_2O_3$ catalyst with 0.6 wt. percent Cu

The same procedure was used as in Example 1 except that 744 g. of Ni($NO_3$)$_2$·$6H_2O$ and 6.4 g. of $$Cu(NO_3)_2 \cdot 3H_2O$$

were used with 150 g. of gamma alumina. The catalyst analyzed 52.2 wt. percent Ni and 0.6 wt. percent Cu. The calcined catalyst showed a total surface area of 129 m.²/g.

EXAMPLE 5.—Ni-$SiO_2$ catalyst from ground kieselguhr with Cu 675 g. of Ni($NO_3$)$_2$·$6H_2O$ and 57 g. Cu($NO_3$)$_2$·$3H_2O$ were dissolved in 3.5 liters of deionized water. 120 g. of acid washed kieselguhr was ground in a mortar with a small amount of Ni($NO_3$)$_2$ solution and then added to the remainder of the Ni($NO_3$)$_2$ solution and stirred. 455 g. $NH_4HCO_3$ was then added to the solution and the mixture was stirred an additional 15 minutes and allowed to settle overnight. The precipitate was filtered and washed and then dried overnight at 235° F. The catalyst was then calcined in air for 4 hours at 750° F. The thus obtained catalyst analyzed 49.5 wt. percent Ni and 6.1 wt. percent Cu and had a total surface area of 112 m.²/g.

EXAMPLE 6.—Ni-$SiO_2$ catalyst with Cu

This catalyst was prepared with the procedure of Example 5 except that 520 g. of Ni($NO_3$)$_2$·$6H_2O$ and 171 g. of Cu($NO_3$)$_2$·$3H_2O$ were used. The catalyst analyzed 38.2 wt. percent Ni and 19.0 wt. percent Cu and had a total surface area of 114 m.²/g.

EXAMPLE 7.—Ni-$Al_2O_3$ catalyst with Cu

The same procedure was used as in Example 1 except that 510 g. Ni($NO_3$)$_2$·$6H_2O$ and 192 g. Cu($NO_3$)$_2$·$3H_2O$ and 150 g. gamma alumina were used. The catalyst analyzed 36.2 wt. percent Ni, 10.6 wt. percent Cu and had a total area of 89 m.²/g.

TABLE I

| Example | Wt. Percent of Total Reduced Metal [1] | | Support | Catalyst Activity [2] |
|---|---|---|---|---|
| | Cu | Ni | | |
| 1 | 0 | 100 | Eta alumina | 50 |
| 2 | 0 | 100 | Kieselguhr | 52 |
| 3 | 0 | 100 | Gamma alumina | 47 |
| 4 | 1 | 99 | ___do___ | 76 |
| 5 | 10 | 90 | Kieselguhr | 20 |
| 6 | 30 | 70 | ___do___ | 4 |
| 7 | 30 | 70 | Gamma alumina | 5 |

[1] All catalysts contain approximately 50 wt. percent of total reduced metal on support. The values shown are on a dry basis.
[2] Activity is expressed as percent conversion in a standard town gas catalyst screening test. Conditions are 2.8 w./Hr./w. of hexane, 2 lbs. $H_2O$/lb. hexane, 700° F. (isothermal lead bath), and 500 p.s.i.g. Percent conversion is determined after 3 to 5 hours of running.

The data in Table I show the effectiveness of Cu as a promoter in suitable small amounts for catalysts in which the Cu and Ni are precipitated on preformed supports. It has been found that the activity of massive Ni catalysts can be increased by using a coprecipitation technique, whereby the nickel and copper ions are coprecipitated as hydroxides, carbonates or basic carbonates with the corresponding compounds of aluminum or silicon to give increased interspersion of the metal and support. By this techniuqe, the total surface area, the reduced metal (Ni and Cu) surface area, and the relative catalyst activities can be increased relatively.

EXAMPLE 8.—Coprecipitated Ni-$Al_2O_3$

To prepare an unpromoted high surface area nickel catalyst using the coprecipitation technique, 740 g.

$$Al(NO_3)_3 \cdot 9H_2O$$

and 750 g. Ni($NO_3$)$_2$·$6H_2O$ are dissolved in 3 liters of deionized water. With the solution at a temperature of approximately 50° F., 1040 g. of $NH_4HCO_3$ are added at a controlled rate while heating sufficiently to avoid gelling. The slurry is stirred continuously during the coprecipitation. After the precipitation is finished, the slurry is stirred for an additional time, then the precipitate is separated from the excess solution by filtering without washing. The resulting precipitate is dried overnight in an oven at 350° F. and then calcined in air at 750° F. When the calcined catalyst is ready to be used, it is reduced for several hours at 700° F. with $H_2$ added.

The resulting unpromoted catalyst thus formed has a nickel content of 45 to 50 wt. percent. It has a B.E.T. total surface area of 170 to 195 m.²/g. and a nickel surface area of 20 to 29 m.²/g., measured after the $H_2$ reduction. The surface areas vary in the ranges stated depending on the temperatures used in the precipitation, drying and calcining, but it is noteworthy that in every instance the surface areas are considerably higher and more stable than the surface areas of catalysts prepared using a preformed alumina as a support material.

EXAMPLE 9.—Coprecipitated Ni-$Al_2O_3$ with promoter

Using the coprecipitation technique, similar proportions and conditions as set forth in Example 8 are used except that copper is introduced in amounts of from about 0.1 wt. percent to 6 wt. percent of total Ni+Cu by the addition of 0.6 to 35 g. of Cu($NO_3$)$_2$·$3H_2O$ to the aqueous solution. The resulting copper promoted catalysts can thus be made to have high surface areas in the same range as the unpromoted Ni-$Al_2O_3$ catalyst formed by the coprecipitation technique.

EXAMPLE 10.—Unpromoted and promoted Ni-$SiO_2$ catalyst formed by coprecipitation An unpromoted Ni-$SiO_2$ catalyst is prepared by adding 50 g. of acid washed kieselguhr to 3.5 liters of deionized water and by adding to the aqueous slurry of kieselguhr 650 g. of Ni($NO_3$)$_2$·$6H_2O$ with 320 g. $Na_2SiO_3$·$9H_2O$, and the slurry solution is heated to boiling while stirring. The nickel and silicate ions are coprecipitated by adding 800 g. of $NH_4HCO_3$ to the heated slurry which is further boiled and stirred for an additional time. The resulting slurried solid is separated from the aqueous solution by filtration and washed. The washed solids are dried overnight at 230° F. and then calcined for 4 hours in air in an oven at 750° F. The calcined material analyzes 43.7 wt. percent of nickel and has a total surface area of close to 300 m.²/g. of catalyst as measured by $N_2$ adsorption (B.E.T. method). After reduction of the nickel in the catalyst by $H_2$ at 700° F. for 15 hours, the nickel surface area is 47 m.²/g. of catalyst, as determined by $H_2$ chemisorption.

Varying the amount of the metasilicate changes the total surface area; e.g., with no metasilicate the total surface area is as low as 100 m.²/g.; the surface area goes through a sharp maximum when the $SiO_2$ of the metasilicate is in a proportion of 30 to 75 wt. percent of the total $SiO_2$ from both the metasilicate and the kieselguhr. The nickel surface area also is varied similarly to be in the range of 40 to 60 m.²/g. of catalyst.

EXAMPLE 11.—High surface area Ni-$SiO_2$ with Cu promoter

To incorporate a suitable amount of copper promoter with the nickel in the high surface area Ni-$SiO_2$ catalyst, from 0.5 to 31 g. of Cu($NO_3$)$_2$·$3H_2O$ is dissolved with the nickel nitrate as shown in Example 10 in the aqueous solution where the coprecipitation is made to take place by addition of NH₄HCO₃.

Using a standard screening test, a high surface area Ni-SiO₂ catalyst was found capable of giving about 78% conversion of n-hexane feed when the n-hexane was reacted with steam in a proportion of 2 lbs. H₂O/lb. hydrocarbon at 700° F., 500 p.s.i.g., and a space velocity of 5.6 w./hr./w. The incorporation of the copper in small amounts of 0.1 to 6 wt. percent of total Cu+Ni may increase the activity by as much as 50%. The gas products have compositions like those mentioned with respect to the Ni-Al₂O₃ catalyst. Other modifications may be made in the catalyst composition with respect to the support or use of other kinds of effective promoters in addition to the copper, such other promoters being preferably compounds containing the metals Ba, Sr, Cs, Ce, La, Y, K and Ca, used in similar proportions. Although various hydrocarbons higher boiling than methane are suitable hydrocarbon reactants, the preferred reactants are naphtha hydrocarbons which are predominantly paraffinic, e.g., pentane through octane. The hydrocarbon feed is preferably low in sulfur, e.g., less than 3 p.p.m. The reaction of the mixture stream passing through the catalyst bed is preferably controlled to avoid excessive increases in temperature which tend to occur due to exothermic reactions. The life of the catalyst is prolonged by preventing poisons from entering, and by controlling the temperature conditions so that the catalyst is not subjected to excess oxidation or sintering which tends to occur as the temperature rises to 900° F. and above.

The invention described is claimed as follows:

1. A catalyst of high activity for producing methane by reactions of higher hydrocarbons with steam and with hydrogen at a temperature in the range of 600° to 925° F. when the catalyst is activated by treatment with H₂, which comprises nickel oxide mixed with an oxide selected from the group consisting of Al₂O₃ and SiO₂, the catalyst containing 25 to 60 wt. percent nickel promoted by copper in a proportion of 0.1 to 6 wt. percent of the total nickel and copper content.

2. A catalyst as described in claim 1 in which the nickel and copper are coprecipitated with aluminum compounds of the class consisting of hydroxides, carbonates and basic carbonates to obtain interspersions of the nickel and copper with aluminum compounds in order to give the catalyst a higher total surface area and a higher nickel surface area.

3. A catalyst as defined in claim 1 in which nickel and copper are coprecipitated with metasilicate to obtain a molecular interspersion of nickel and copper with silica.

4. A catalyst as defined in claim 1, in which the catalyst has a total surface of 100 to 300 m.²/g. and a nickel surface area of 20 to 60 m.²/g., the copper promoted nickel being interspersed with the oxide.

References Cited

UNITED STATES PATENTS

| | | | |
|---|---|---|---|
| 2,234,246 | 3/1941 | Groombridge et al. | 252—474 |
| 2,242,627 | 5/1941 | Strickland | 252—455 |
| 3,119,667 | 1/1954 | McMahon | 23—212 |
| 3,205,182 | 9/1965 | Padovani et al. | 252—454 |

FOREIGN PATENTS

| | | |
|---|---|---|
| 641,332 | 8/1950 | Great Britain. |
| 820,257 | 9/1959 | Great Britain. |

DANIEL E. WYMAN, *Primary Examiner.*

C. F. DEES, *Assistant Examiner.*